US007605372B2

(12) United States Patent
Hachin et al.

(10) Patent No.: US 7,605,372 B2
(45) Date of Patent: Oct. 20, 2009

(54) METHOD FOR AUTHENTICATION BY CHEMICAL MARKING OR TRACING OF AN OBJECT OR A SUBSTANCE

(76) Inventors: Jean-Michel Hachin, 15, rue Trebois, Levallois-Perret (FR) 92300; Claude Lambert, 16 allee des Thuyas, Saint Michel sur Orge (FR) 91240

( * ) Notice: Subject to any disclaimer, the term of this patent is extended or adjusted under 35 U.S.C. 154(b) by 882 days.

(21) Appl. No.: 10/533,356

(22) PCT Filed: Oct. 29, 2003

(86) PCT No.: PCT/FR03/03233

§ 371 (c)(1),
(2), (4) Date: Apr. 29, 2005

(87) PCT Pub. No.: WO2004/040504

PCT Pub. Date: May 13, 2004

(65) Prior Publication Data

US 2006/0054825 A1 Mar. 16, 2006

(30) Foreign Application Priority Data

Oct. 29, 2002 (FR) .................................. 02 13718

(51) Int. Cl.
*G01T 1/20* (2006.01)

(52) U.S. Cl. .................................. 250/361 R; 250/362

(58) Field of Classification Search .............. 250/458.1, 250/484.2, 486.1, 361 R, 362, 367, 361 C
See application file for complete search history.

(56) References Cited

U.S. PATENT DOCUMENTS

| | | | | |
|---|---|---|---|---|
| 5,592,561 | A | 1/1997 | Moore | |
| 5,974,150 | A * | 10/1999 | Kaish et al. | 713/179 |
| 6,610,351 | B2 * | 8/2003 | Shchegolikhin et al. | 427/7 |
| 2005/0059681 | A1 * | 3/2005 | Cremer et al. | 514/260.1 |

FOREIGN PATENT DOCUMENTS

| | | | |
|---|---|---|---|
| EP | 1 182 048 | A | 2/2002 |
| FR | 2 757 658 | A | 6/1998 |
| FR | 2 822 269 | A | 9/2002 |
| WO | WO 97/24699 | A1 | 7/1997 |

* cited by examiner

*Primary Examiner*—David P Porta
*Assistant Examiner*—Carolyn Igyarto
(74) *Attorney, Agent, or Firm*—Browdy and Neimark, P.L.L.C.

(57) ABSTRACT

The invention concerns a method for authenticating different objects or substances to be identified comprising at least two phases: during an initial phase, selecting a plurality of chemical markers, assigning to and incorporating in each of the objects or substances a combination of markers, establishing an identification and/or authentication code (blocks 2, 11), storing in memory data or code for identifying and/or authenticating all the objects or substances and annex data; during an identification and/or authentication phase: a spectrophotometric analysis so as to determine a specific scanned code of the presence or absence of the markers (blocks 3, 4), identifying the object or the substance by comparing the scanned code and the identification and/or authentication codes (block 6). The invention is particularly applicable to fighting against counterfeiting, to automatic sorting, and the like.

13 Claims, 4 Drawing Sheets

METHOD FOR AUTHENTICATION BY CHEMICAL MARKING OR TRACING OF AN OBJECT OR A SUBSTANCE

BACKGROUND OF THE INVENTION

1. Field of the Invention

The present invention concerns a method for authenticating objects or substances using chemical marking or tracing. It applies more particularly but not exclusively to the fight against counterfeiting, to automatic sorting.

2. Description of the Prior Art

As a general rule, numerous objects or substances whether in transit or on sale are identified by means of a bar code. With this code it is possible to define products but it is not sufficient for their authentication i.e. for certifying after analysis that the object or substance is indeed the one defined by the bar code.

In an attempt to solve this problem, methods integrating a chemical marker into objects or substances have been developed. However, it is necessary to have recourse to laboratories to perform analyses and detect counterfeited products: this procedure is far too time-consuming and laborious.

As for the solution which consists of developing analytical equipment specific to each product, this solution is not economically viable.

OBJECT OF THE INVENTION

The object of the invention is to solve these drawbacks by proposing that only one apparatus is used for a multiplicity of products.

SUMMARY OF THE INVENTION

For this purpose, it proposes an authentication method for different objects or substances to be identified, comprising at least the two following successive phases:

An initial phase comprising:

- choosing a plurality of chemical markers which, when excited by an incident light ray, emit energy radiations whose frequency spectra can be distinguished from one another and with respect to the objects or substances in which they are intended to be incorporated,
- allocating to and then incorporating in each of the objects or substances a previously chosen combination of markers, the combination being different to those allocated to other objects,
- determining an authentication code using parameters relating to the presence or absence of markers in the allocated combinations,
- storing, in a computer memory system, the authentication code of all the objects or substances, and related data corresponding to these objects or these substances,
- allocating to the object or substance an identification code, such as a bar code or similar, this identification code possibly being associated with the object, with the substance, with its recipient and/or its packaging,
- storing, in the memory of said system, the identification codes for each of the objects,
- defining a correspondence between the identification codes and authentication codes.

An identification and authentication phase by said system, this phase comprising:

- theoretical identification of the object or substance by reading the identification code associated with the object,
- spectrophotometer analysis of at least part of the object or substance so as to detect said above parameters, in particular the presence or absence of markers, and determination of the authentication code of the object or substance,
- authentication of the object if the theoretical identification code corresponds to the authentication code,
- emission of a validation signal when correspondence is detected or of an alert signal when the authentication code does not correspond to the identification code.

In this method, the spectrophotometric analysis phase may comprise the following steps:

- irradiation of the marked object or substance using a light beam with wide frequency spectrum,
- sending the waves transmitted or reflected by the object or substance, after emission by a generator, onto a dispersing element which deflects the waves so as to obtain a light spectrum of the light intensity at different zones of the spectrum corresponding to different wavelength ranges, or onto specific or dedicated filters,
- detecting the light intensity in each zone,
- comparing this intensity with one or more threshold values specifically allocated to this zone and which are stored in memory as being said above parameters,
- the result of this comparison contributing towards determining the authentication code of the object.

Advantageously, the determination of the spectrum zones to be analysed, and of the different parameters allocated to each of these zones, may be made by the system using the identification data. This solution provides improved reliability of results and considerably reduces the required power of processing means.

The parameters relating to the presence or absence of markers in the allocated combination and used for determining an identification and/or authentication code particularly comprise:

- the presence or absence of fluorescence,
- a fluorescence time that is greater or less than at least one threshold value,
- the presence or absence of a peak at a predetermined wavelength and optionally the amplitude and/or width of this peak,
- emission peak heights corresponding to a concentration of markers that is greater or less than one or more predefined threshold values.

To increase the number of possible combinations, different concentrations of markers may be used to obtain rays of different intensity.

Also, to overcome any optical factors likely to disturb the reading and subsequent spectrophotometric analysis, the invention proposes two measures which may be used separately or in combination.

The first measure consists of servo-controlling the light intensity emitted by the light radiation generator in relation to the difference between the value of the light intensity detected over a predetermined frequency range that is not affected by the presence of the markers, and a predetermined set value.

The second measure consists of incorporating in the object and/or substance one or more calibration markers used by the computer system for correction or calibration purposes so as to overcome noise derived for example from the composition of the substance or object, from variations in positioning such as angle of incidence and distance to the object, or from transparent matter surrounding this substance or object.

These two measures prove to be essential when several intensity levels are used as parameters.

According to one variant, chemical marking may be made via a label, an insert or any other medium containing the marker or markers.

Advantageously, this label may comprise a reflective zone coated with a transparent layer containing markers. With this solution it is possible to conduct reflection spectrophotometry which considerably reduces energy losses.

The authentication data may comprise the combination of chosen markers, the wavelengths of characteristic rays, their intensity, possible fluorescence time . . .

It is therefore not necessary to cover all wavelengths, it is sufficient to analyse the ranges of values corresponding to the expected rays which are identified using the identification code in order to verify their presence or absence without taking into account the zones located outside these ranges.

To conduct authentication, the operator performing the analysis does not need to know the theoretical identity of the object or substance since it is provided by the bar code directly to the computer system performing data comparison.

Said method may be used in the fight against counterfeiting, but may also be applied to automatic sorting. For example, when recycling plastic, it could be considered to use a combination of markers per type of plastic or per grade of plastic enabling subsequent sorting per type or per grade once authentication has been carried out.

DESCRIPTION OF THE PREFERRED EMBODIMENTS

Figure 1:
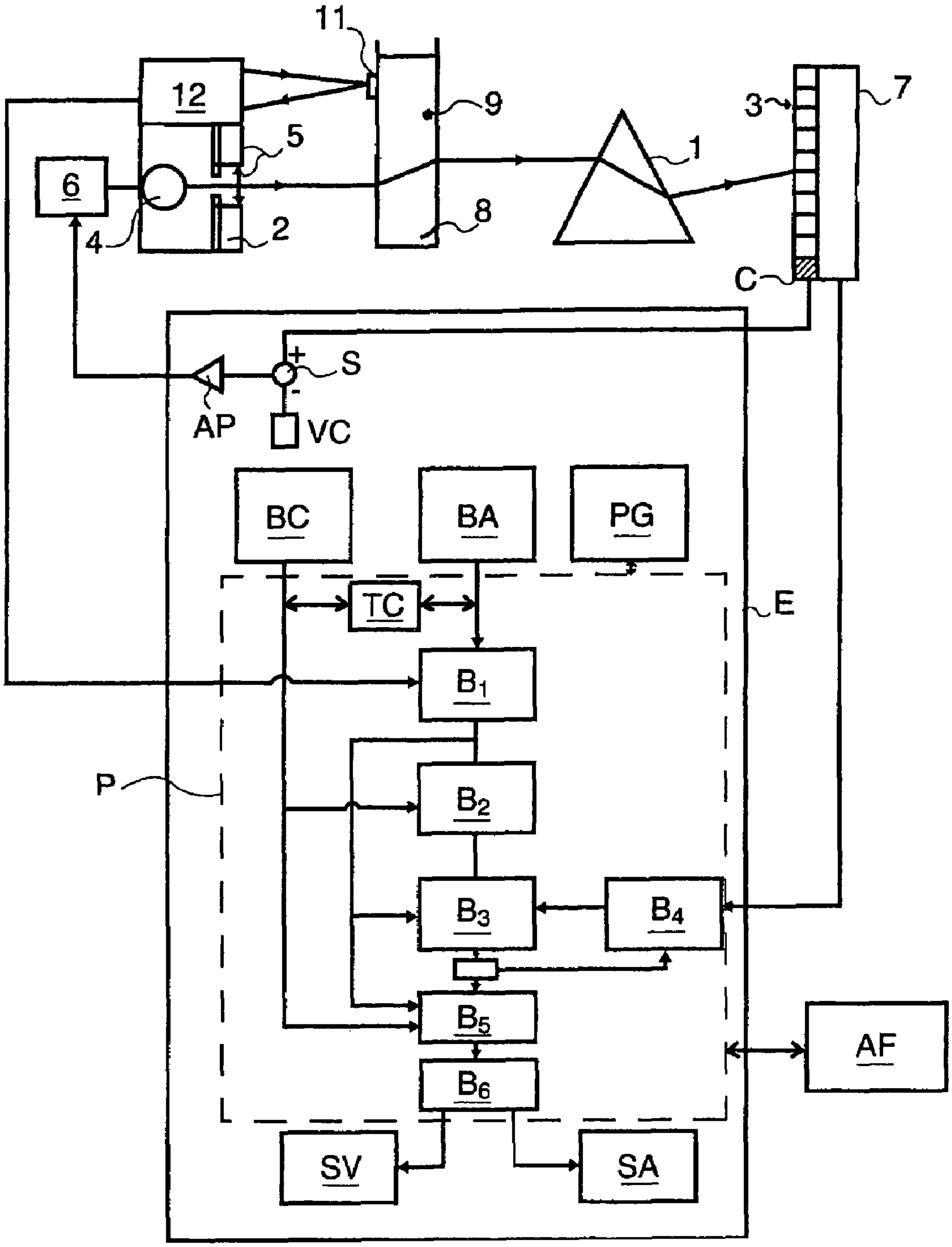
FIG. 1 is a diagram showing a device using the method of the invention, the waves being transmitted.

In the example in FIG. 1, it is the waves which are transmitted through a substance containing a combination of markers and more precisely onto a sample possibly diluted in a solution which are analysed.

It is to be noted that this type of analysis can also be made on objects whose material so permits, or directly on the substance through its recipient.

In this example the identification and authentication device using the method of the invention comprises a spectrophotometer comprising:

- a generator of light radiation with long frequency spectrum and adjustable intensity using a light source 4 supplied by a power-adjustable electric current generator 6; a collimator 2 in whose axis a lens 5 is positioned,
- a product sample 8 contained in a transparent recipient 9 positioned in the optical axis of the light generator,
- a dispersing element 1 positioned in said axis on the side of the recipient 9 located opposite the light generator; this dispersing element 1 (prism or diffraction network) decomposes the light ray in relation to frequency, producing a spectrum,
- spectrum detection means, here a charge transfer detector array 3 to detect the radiations emitted at different spectral levels by the dispersing element 1 and to transmit a digital signal representing the detected spectrum to an electronic system.

As mentioned previously, the light source 4 is a source with wide frequency spectrum. It may consist of arc lamps (Xenon type) or of a light bulb generating a white light. Optionally, it may consist of a plurality of laser radiation sources specifically chosen in relation to the type of the chemical markers used, a mixer then being used to mix the different radiations emitted by these sources.

The lens 5 may for example consist of an achromatic doublet.

Evidently, the electric current generator 6 may also be used to supply the electronic circuits associated with the spectrophotometer.

In this example, the detector array 3 comprises a cell C located at a position of the spectrum that is not affected by the presence of chemical markers.

This cell C emits a detection signal applied (after amplification) to the input of a subtractor S whose second input receives a calibrated voltage VC. The output of this subtractor S is applied to a power amplifier AP which pilots the generator 6 so that the output of the subtractor S is maintained at a constant value, preferably equal to zero.

With this arrangement, it is ensured that the level of light intensity received by cell C is constant. This overcomes disturbances which may cause variations in the light intensity of the radiation transmitted through sample 8.

According to the invention, the light source is associated with a bar code reader 12 which emits light radiation (laser for example) in the direction of a bar code 11 carried by recipient 9. This reader 12 comprises a receiver enabling detection of the radiation reflected by the bar code. An electronic circuit processes the data received by this receiver and generates a digital signal representing this bar code to be sent to the electronic system E.

The electronic system comprises a processor P (indicated by the dashed line) associated with means for memorising a database of identification codes BC, a database of authentication codes BA and a management programme for the various processing operations PG, and with display and signalling means AF.

This processor P is designed so as to conduct theoretical identification (block B1) of recipient 9 using the signal delivered by the bar code reader 12, from the database of identification codes BC. Once theoretical identification has been made, processor P determines the spectrum zones to be investigated (block B2). For this purpose, in addition to the readout identification code, it uses the corresponding authentication code by means of a correspondence table TC between the two databases BC, BA. The processor P then analyses (block B3) the spectrum zones previously determined through the signal provided by the detector array 3.

If a calibration marker is used, this signal may be corrected (block B4) before analysis using the digital signal produced by the detector corresponding to this calibration marker.

The processor P then determines (block B5) the detected authentication code which it compares (block B6) with the predetermined identification code. If there is agreement between these two codes, the processor emits a validation signal SV. If not, the processor emits an alarm signal SA.

Figure 2:
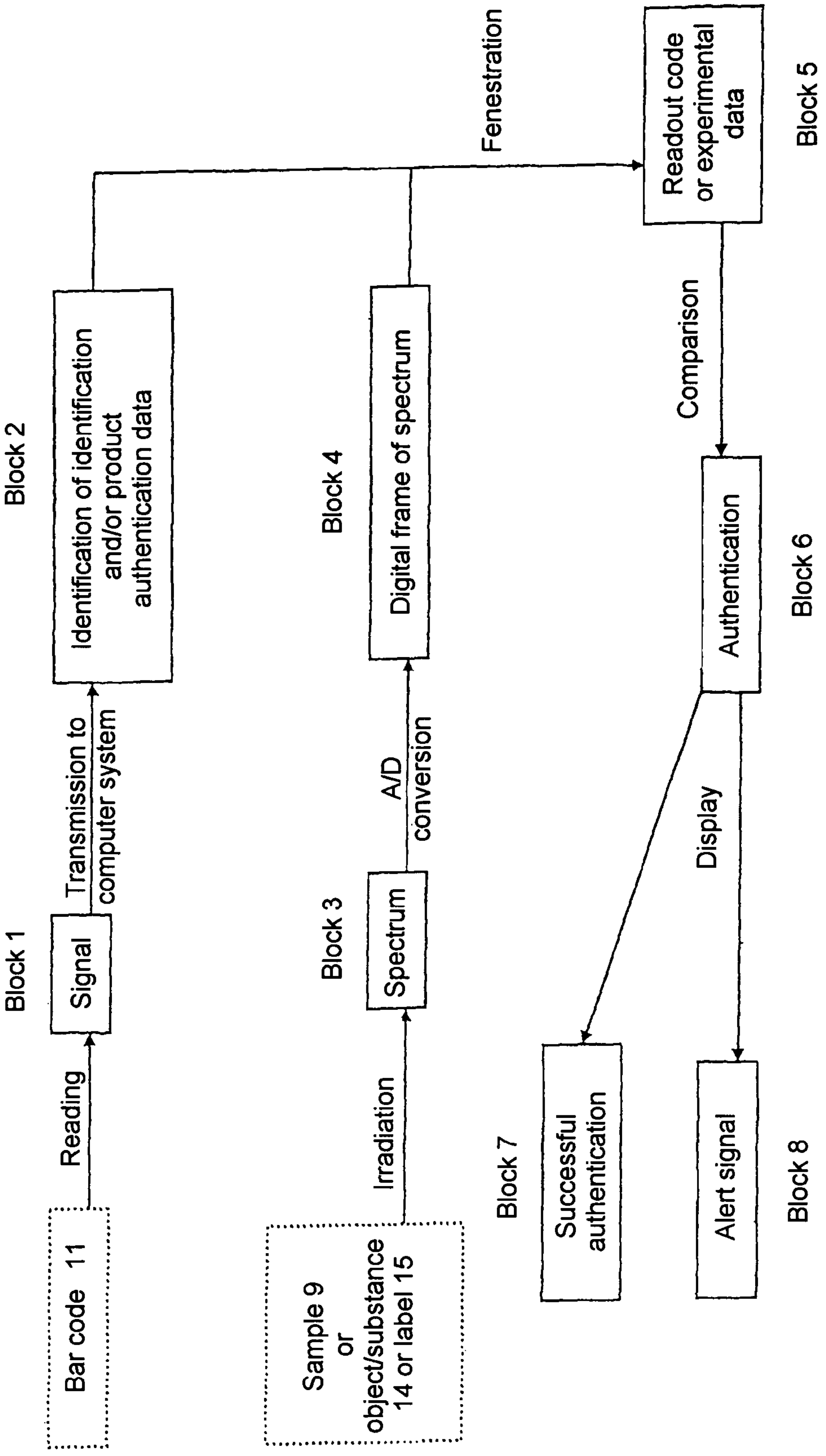
FIG. 2 is a functional diagram of the method of the invention.

The method of the invention used by the device illustrated FIG. 1, comprises the following phases (FIG. 2):

An initial phase comprising:

- choosing markers in relation to their respective suitability and with respect to the substance, adding these markers at different concentrations to said substance, determining the authentication codes formed of binary figures representing the presence or absence, even the concentration of the markers, these codes being stored in memory in the electronic system E, allocating, to each of these codes, a substance identified by a bar code 11.

An identification and/or authentication phase comprising:

reading the bar code 11, located on the recipient of the marked substance by means of the bar code reader 12 and emitting a specific signal containing an identification code of said substance (block 1), transmitting said signal to the electronic system E which identifies this identification code (block 2), spectrophotometric analysis comprising:

irradiation of the substance using the ray source 4, transmission of the transmitted waves onto the dispersing element 1 which deflects them differently in relation to their wavelength, obtaining a spectrum of transmitted radiation by means of the planar waves so deflected, which, in a detection zone consisting of the series of charge transfer detection arrays 3, give a succession of images of the source (block 3), sampling this spectrum then converting the analogue signal into a digital signal having a predetermined digital frame (block 4), windowing in relation to the wavelength ranges indicated in the authentication data stored in memory and extracted through identification of the bar code, so as only to give consideration to the presence of absence or rays characteristic of the markers, which then determines a readout code (block 5), comparison of the data or authentication code with the experimental data or readout code so as to conduct authentication of the substance (block 6), visual display of the result, for example on a screen 13 and/or audibly:

successful authentication if the authentication codes and readout code tally (block 7), alert signal in the event of non-authentication if there is disagreement between the authentication codes and the readout code (block 8).

Figure 3:
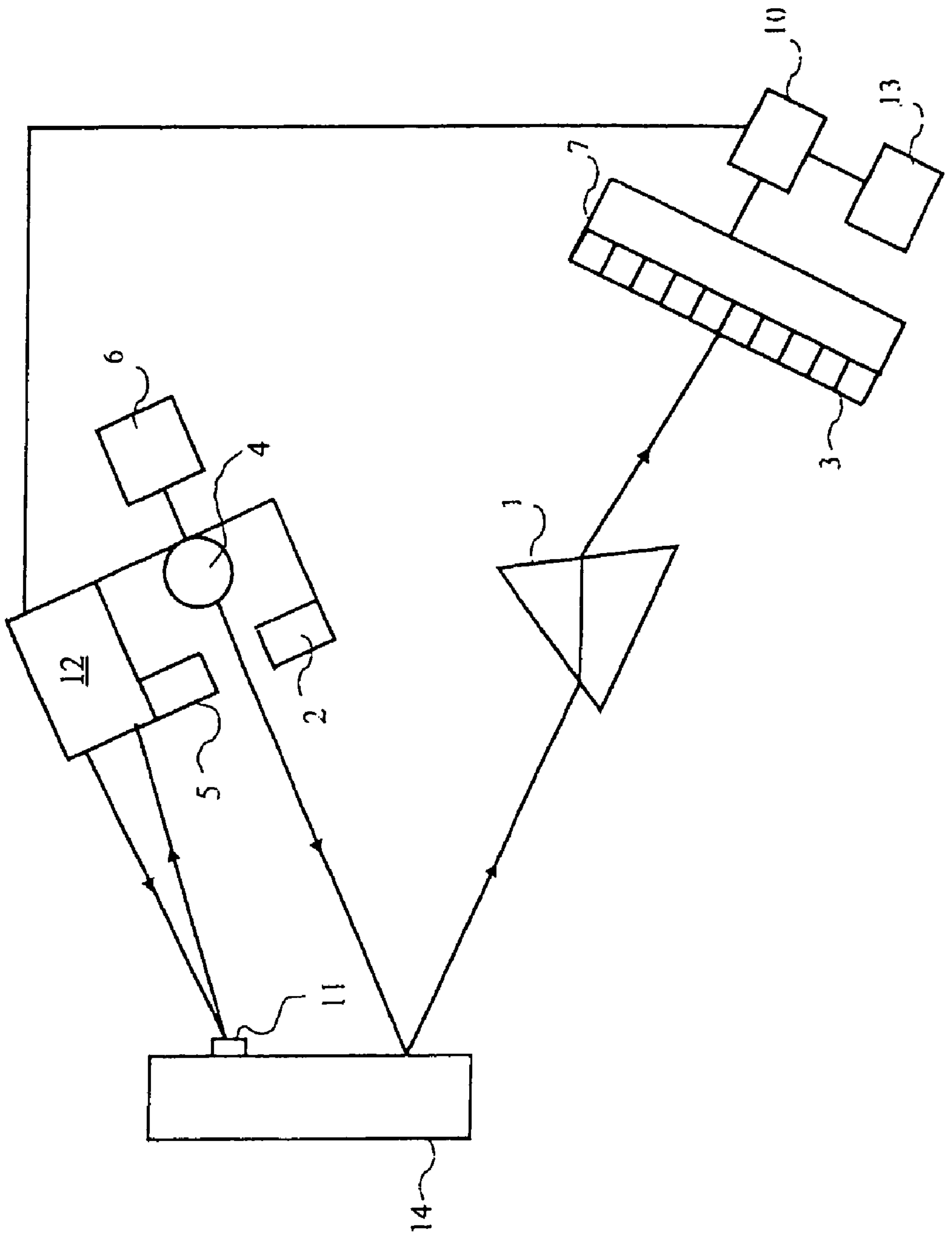
FIG. 3 is a diagram showing a device using the method of the invention, the waves being reflected.

FIG. 3 illustrates an analysis using waves reflected on at least part of an object or substance 14.

In this case, the dispersing element 1 is located on the axis of the reflected wave.

The method is the same as described above for the example in FIG. 1.

Figure 4:
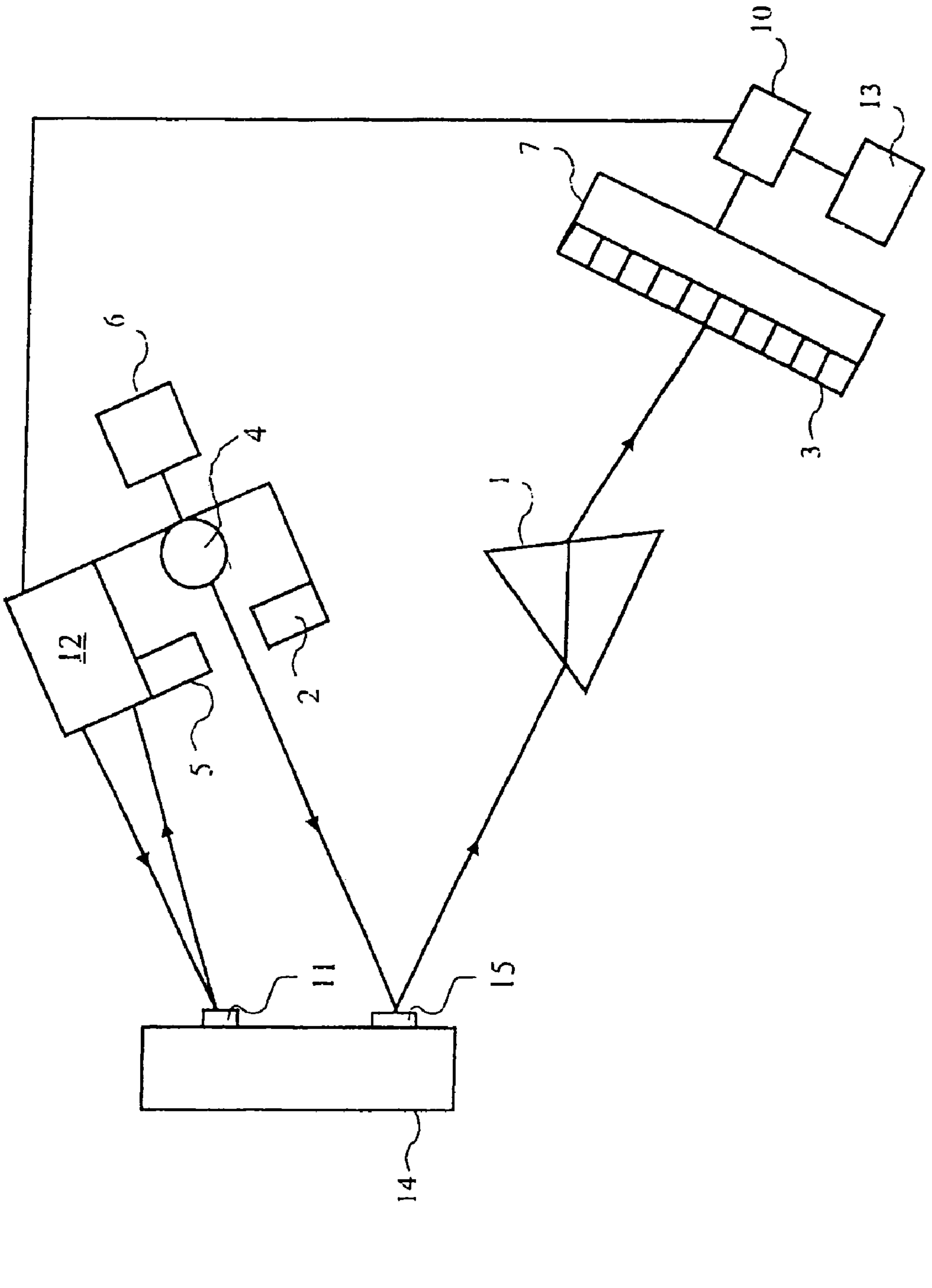
FIG. 4 is a diagram showing a device using the method of the invention, the waves being reflected onto a label.

FIG. 4 illustrates a variant of the example in FIG. 3. Here the markers are not directly integrated in the object or substance 14 but are applied by means of a film, a transparent varnish on a label 15 which is affixed to the object to be marked.

The method is the same as described above for the example in FIG. 1.

For a better analysis result, the label may be reflective.

In addition, the use of a label free of any marker and optionally coated with a film or varnish used for applying markers may, when processing data, enable the elimination of corresponding signals and simplify analysis. The marked label then the blank label are irradiated after which, during data processing, the spectrum data of the blank label are subtracted from the spectrum data for the marked label.

When fluorescent markers are used, it can be considered to conduct a second measurement after a time $\delta t$ to verify fluorescence time.

The tracers used may be organic or inorganic. They may contain rare earths such as dysprosium, europium, samarium, yttrium . . .

Some markers used and their characteristics are given as examples in the table below.

They are commercially available from companies such as BASF, Bayer, Glowburg, Lambert Riviere, Phosphor Technology, Rhodia, SCPI, . . .

| Marker | Excitation wavelength $\lambda_{ex} + \Delta\lambda_{1/2}$ | Wavelength of emission peak $\lambda_{emax} + \Delta\lambda_{1/2}$ (nm) |
|---|---|---|
| A | 300 ± 40 | 480 ± 6 |
| | | 572 ± 6 |
| B | 300 ± 40 | 562 ± 10 |
| | | 601 ± 6 |
| C | 335 ± 35 | 470 ± 85 |
| D | 365 ± 70 | 480 ± 90 |
| E | 350 ± 20 | 612 ± 3 |
| F | 380 ± 45 | 480 ± 75 |
| G | 365 | 610 ± 50 |

It is to be noted that the markers are not limited to commercially available markers, they may be synthesised by total synthesis or derived from commercial markers.

The invention claimed is:

1. A method for identifying and authenticating different objects or substances, the method using a computer system coupled to spectrophotometry means, said method comprising at least the two following successive phases:

an initial phase comprising:

choosing a plurality of chemical markers which, when excited by an incident light ray, emit energy radiations whose frequency spectra can be distinguished from one another and with respect to objects and substances in which they are intended to be incorporated, allocating then incorporating, in each of the objects or substances, a combination of markers that is different than combinations allocated to the other objects or substances, determining an authentication code for each of the objects or substances defined using parameters comprising at least the presence or absence of markers in the allocated combination of markers, storing, a memory of the computer system, the authentication code of all the objects or substances and of related data corresponding to said objects or substances, allocating an identification code to each of said objects or substances, said identification code being associated with at least one of said objects or substances and a recipient or packaging for the at least one of said objects or substances, storing, in the memory of said system, the identification codes for each of the objects or substances, defining a correspondence between the identification codes and the authentication codes, an identification and authentication phase by said system comprising:

determining a theoretical identification code for one of said objects or substances by reading the identification code associated with said one of the objects or substances and the recipient or packaging for the object or substance, spectrophotometric analyzing at least part of the one object or substance so as to detect said above parameters, and determining an experimental authentication code of the one object or substance, authenticating said one object or substance if the theoretical identification code corresponds to the experimental authentication code, emitting a validation signal if a correspondence is detected or an alert signal if the experimental authentication code does not correspond to the theoretical identification code, wherein said spectrophotometric analysis comprises the following steps:

determining zones of the spectrum to be analysed and the different parameters allocated to each of these zones using said above identification codes, irradiating the one object or substance with a light ray emitted by a generator, sending transmitted or reflected waves onto a dispersing element which deflects them so as to obtain a light spectrum of the light intensity in said zones of the spectrum corresponding to different wavelength ranges, detecting the light intensity in said zone, comparing the detected light intensity with one or more threshold values specifically allocated to said zone and which are recorded in memory as being said above parameters, and using the result of this comparison in the determination of the experimental authentication code of the object.

2. Method as in claim 1, comprising servo-controlling the light intensity emitted by the light radiation generator in relation to the difference between the value of the detected light intensity, over a predetermined frequency range not affected by the presence of the markers, and a predetermined set value.

3. Method as in claim 1, comprising the incorporation into the object and/or substance of one or more calibration markers by means of which the computer system conducts corrections and/or calibration so as to overcome noises possibly deriving from the composition of the substance or object, from variations in positioning such as the angle of incidence of the radiation emitted by the light ray generator, and distance to the object.

4. Method as in claim 1, wherein said above generator of light radiation comprises a light source with wide frequency spectrum such as an arc lamp or a light bulb generating a white light.

5. Method as in claim 1, wherein said generator of light radiation comprises a plurality of laser radiation sources specifically chosen in relation to the type of chemical markers used, and a mixer to mix the different radiations emitted by these sources.

6. Method as in claim 1, wherein said processing of data from spectrophotometric analysis comprises the following steps:

sampling of the spectrum, conversion of the analogue signal into a digital signal having a predetermined frame, windowing in relation to the wavelength ranges indicated in the authentication data stored in memory, and extracted by identifying the bar code, so as to determine a readout code with said above parameters, comparison of authentication data with the experimental data or readout code, displaying of the result visually and/or audibly so as to indicate:

successful authentication if the authentication codes and the readout code coincide, an alert in the event of non-authentication if the authentication codes and the readout code do not tally.

7. Method as in claim 1, wherein said marking is made via a medium containing the marker or markers, this medium being a label or an insert.

8. Method as in claim 7, wherein said medium containing the marker or markers is reflective.

9. Method as in claim 7, wherein a blank medium free of any marker is added and also irradiated then, during data processing, the spectrum data of the blank medium are subtracted from the spectrum data of the marked medium so as to eliminate corresponding signals and to simplify analysis.

10. Method as in claim 9, wherein, during data processing, the spectrum data of the object or substance free of markers are subtracted from the spectrum data of the marked object or substance.

11. Method as in claim 1, wherein said combination of markers comprises at least one fluorescent marker.

12. Method as in claim 9, wherein said parameters also comprise the duration of the light emission of the substance to be identified subsequent to excitation.

13. Method as in claim 12, wherein said parameters comprise:

the presence or absence of fluorescence, a fluorescence time greater or less than a threshold value, the presence or absence of a peak at a preset wavelength and/or emission peak heights corresponding to a concentration of markers that is greater or less than a predefined threshold value.

* * * * *